(12) United States Patent
Saito et al.

(10) Patent No.: US 11,063,312 B2
(45) Date of Patent: Jul. 13, 2021

(54) CELL

(71) Applicant: TOYOTA JIDOSHA KABUSHIKI KAISHA, Toyota (JP)

(72) Inventors: Akira Saito, Toyota (JP); Fumihiko Ishiguro, Obu (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 16/686,819

(22) Filed: Nov. 18, 2019

(65) Prior Publication Data

US 2020/0185663 A1 Jun. 11, 2020

(30) Foreign Application Priority Data

Dec. 11, 2018 (JP) .............................. JP2018-232044

(51) Int. Cl.
*H01M 50/10* (2021.01)
*H01M 50/116* (2021.01)
(Continued)

(52) U.S. Cl.
CPC .......... *H01M 50/116* (2021.01); *H01G 11/74* (2013.01); *H01G 11/80* (2013.01); *H01M 50/10* (2021.01)

(58) Field of Classification Search
CPC .... H01M 2/028; H01M 2/0207; H01M 2/024; H01M 10/0431; H01M 2/0275;
(Continued)

(56) References Cited

U.S. PATENT DOCUMENTS

| 2011/0052975 A1* | 3/2011 | Lee | ..................... H01M 2/0277 |
| | | | 429/178 |
| 2012/0171525 A1* | 7/2012 | Guen | ................ H01M 10/0436 |
| | | | 429/53 |

(Continued)

FOREIGN PATENT DOCUMENTS

| WO | 2014/002647 A1 | | 1/2014 | |
| WO | WO 2015/159717 | * | 10/2015 | .............. H01M 2/34 |
| WO | WO2018/147603 | * | 8/2018 | .............. H01M 2/06 |

OTHER PUBLICATIONS

English Translation of WO 2015/159717.*

*Primary Examiner* — Milton I Cano
*Assistant Examiner* — Kiran Akhtar
(74) *Attorney, Agent, or Firm* — Dickinson Wright, PLLC

(57) ABSTRACT

Provided is a cell in which the possibility of metallic foreign metal penetrating into an electrode assembly is reduced. The cell includes a rectangular cell case including a case main body and a lid member, an electrode assembly housed in the cell case, and an insulating film disposed between the cell case and the electrode assembly. The insulating film is in the form of a sheet, and is disposed between at least the electrode assembly and the bottom surface and the pair of long side surfaces of the cell case, and a pair of end portions of the insulating film in the height direction is located on the lid member side with respect to the electrode assembly. Incisions are provided in a thickness direction of the insulating film, and end portions with respect to the incisions constitute inclined surfaces which incline toward the electrode assembly side.

6 Claims, 7 Drawing Sheets

(51) Int. Cl.
*H01G 11/74* (2013.01)
*H01G 11/80* (2013.01)

(58) Field of Classification Search
CPC .. H01M 2/0217; H01M 2/0277; H01M 2/029; H01M 50/116; H01M 50/10; H01G 11/74; H01G 11/80; H01G 11/82; H01G 11/78–82; Y02E 60/10; Y02T 10/70
See application file for complete search history.

(56) References Cited

U.S. PATENT DOCUMENTS

2015/0340663 A1   11/2015  Minagata et al.
2019/0363316 A1*  11/2019  Lee ..................... H01M 2/263

* cited by examiner

CELL

CROSS-REFERENCE

This application claims priority based on Japanese Patent Application No. 2018-232044 filed on Dec. 11, 2018, the entire contents of which are incorporated herein by reference.

FIELD

The present disclosure relates to a cell.

BACKGROUND

Conventionally, a secondary cell in which a positive electrode and a negative electrode are wound or stacked to form an electrode assembly, and the electrode assembly is housed in an outer case has been used. A configuration has also been employed in which a resin film is interposed between the electrode assembly and the cell case, for the purpose of enhancing the accommodation of the electrode assembly, and also for the purpose of enhancing the electrical insulation between the electrode assembly and the cell case when the cell case is made of a metal (see, for example, WO 2014/002647).

Here, a rectangular cell case is generally configured of a case main body composed of a case having an opening and a lid member. This type of cell is assembled by housing an electrode assembly in the case main body and then covering the opening of the case main body with the lid member and joining. It has been confirmed that foreign matter may enter the cell case in this cell assembly process. In particular, in a cell in which metallic foreign matter has penetrated into the electrode assembly, although no abnormality is observed immediately after the cell is assembled, a micro short circuit may be induced as the cell is used. The micro short circuit may adversely affect the cycle characteristics of the cell, the safety during overcharge, etc. Therefore, the micro short circuit test is performed on the assembled cell, and only the cell determined to be free of defects is delivered. From the viewpoint of cell quality and productivity, it is desirable that the penetration of metallic foreign matter into the electrode assembly be suppressed.

Therefore, an object of the present disclosure is to provide a cell in which the possibility of penetration of metallic foreign matter into the electrode assembly is reduced.

SUMMARY

The cell disclosed herein comprises a rectangular cell case, an electrode assembly housed in the cell case, and an insulating film disposed between the cell case and the electrode assembly. The cell case includes a case main body having an opening, and a lid member that closes the opening, the case main body having a bottom surface opposite to the opening, and a pair of long side surfaces provided so as to rise continuously from the bottom surface. The insulating film has a sheet form and is disposed between at least the electrode assembly and the bottom surface and the pair of long side surfaces, and a pair of end portions of the insulating film in the height direction connecting the bottom surface and the lid member is located on the lid member side with respect to the electrode assembly. Further, in the insulating film, incisions are provided in the thickness direction of the insulating film at least in a part in a width direction which is orthogonal to the height direction and is along the long side surfaces, between a position corresponding to an end portion of the electrode assembly on the lid member side and the pair of end portions, and regions on the side of the pair of end portions with respect to the incisions constitute inclined surfaces which incline toward the electrode assembly side.

In the cell assembly process, metallic foreign matter may inevitably penetrate into the cell case. Such metallic foreign matter may be derived from various articles such as a cell manufacturing apparatus and a cell constituent material, but according to the study conducted by the inventors of the present inventors, for example, the metallic foreign matter often penetrates from the gap between the case main body and the lid member at the time of inserting the electrode assembly into the cell case. Therefore, as described above, by providing an incision in the insulating film on the lid member side and inclining the end portion of the insulating film inward, it is possible to trap suitably the foreign matter which has penetrated from the gap between the case main body and the lid member on the outer side of the insulating film. As a result, even if a metallic foreign matter is introduced into the cell case, it is possible to prevent the metallic foreign matter from penetrating into the electrode assembly and inducing a micro short circuit. In addition, by providing an incision in the insulating film, the end portion of the insulating film can be stably inclined. In other words, a stable inclined surface can be formed.

In one embodiment of the cell disclosed herein, the inclination angle of the inclined surface is more than 0° and equal to or less than 30°. Further, where the dimension of the electrode assembly in the thickness direction orthogonal to the height direction and the width direction is denoted by $T_0$, a distance $T_1$ between the pair of end portions constituting the inclined surface is $0.53 \times T_0$ or more and less than $1 \times T_0$.

With such a configuration, the ratio between the dimension and the distance can be suitably controlled so that the inclined surface is prevented from excessively protruding toward inside of the cell case. Thereby, for example, the above effects can be obtained while avoiding interference with injection of the nonaqueous electrolytic solution in a cell having, for example, a configuration in which a lid member is provided with a liquid injection hole, the case main body and the lid member are joined, and the nonaqueous electrolytic solution is injected into the cell case.

In one embodiment of the cell disclosed herein, the depth of the incision is 1/2.5 or more and 1/1.25 or less of the thickness of the insulating film.

With such a configuration, when the inclined surface of the insulating film is inclined, breakage of the insulating film at the incision portion can be suppressed. As a result, the above effects can be obtained while maintaining safety.

In one embodiment of the cell disclosed herein, the incision is provided on the surface of the insulating film facing the case main body. With such a configuration, the inclined surface of the insulating film can be easily inclined.

In one embodiment of the cell disclosed herein, the cell case is made of a metal, and the case main body and the lid member are welded.

Where the cell case is made of a metal, when the case main body and the lid member are fitted, the case main body and the lid member are rubbed to generate metallic foreign matter, which may penetrate into the cell case. Where burrs are present at the end portions of the case main body or the lid member, the probability of metallic foreign matter generation due to rubbing is increased. In addition, when the case main body and the lid member are joined by welding, weld spatter (typically, minute droplets of molten metal)

may be generated and introduced into the cell case. Therefore, if the configuration of the present art is adopted for a cell in which there is a high possibility of penetration of metallic foreign matter, a micro short circuit caused by the metallic foreign matter is more effectively suppressed.

DETAILED DESCRIPTION

Described hereinbelow is an embodiment according to the art disclosed herein. It should be noted that matters other than those specifically mentioned in the present specification and necessary for the implementation of the present art (for example, the general configuration and manufacturing process of a cell not characterizing the present art) can be understood by a person skilled in the art as a design matter based on the related art in the pertinent field. The present art can be implemented based on the contents disclosed in the present description and common technical knowledge in the pertinent field. In the present description, the notation "A to B" indicating a numerical range means A or more and B or less.

The cell in the present art may be a primary cell or a secondary cell. In the present description, the term "secondary cell" refers to a power storage device in general that can be repeatedly charged and discharged, and is a term inclusive of the so-called storage cells and storage elements such as electric double layer capacitors. Hereinafter, the present art will be described by taking a case where the cell is a lithium ion secondary cell as an example. In the present description, the term "lithium ion secondary cell" refers to a secondary cell in which lithium ions are used as charge carriers and charge and discharge are realized by the movement of charges associated with lithium ions between positive and negative electrodes.

Figure 1:
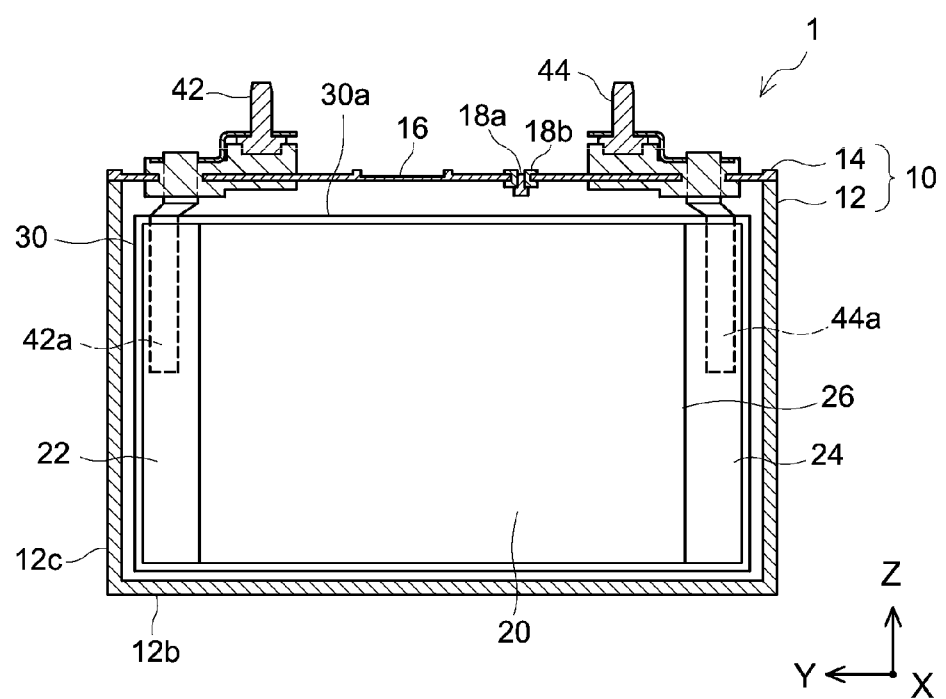
FIG. 1 is a longitudinal sectional view schematically showing the structure of a cell according to one embodiment.
Figure 2:
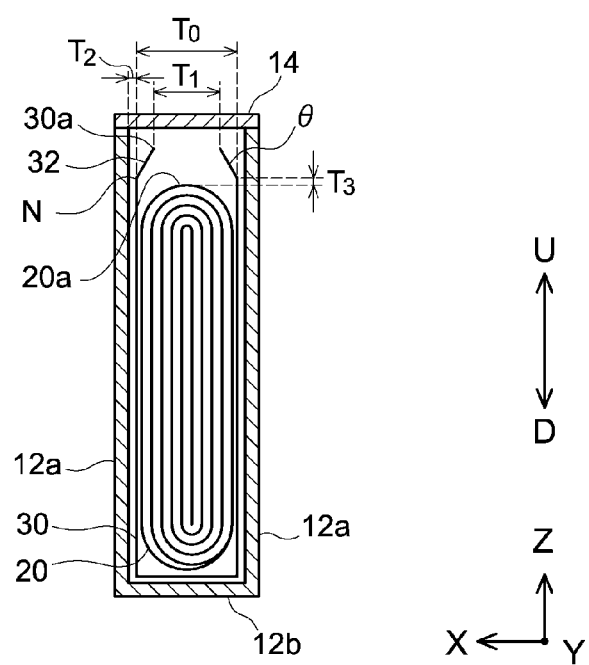
FIG. 2 is a cross-sectional view schematically showing the structure of the cell according to one embodiment.

FIG. 1 is a longitudinal sectional view of a cell 1 according to one embodiment, and FIG. 2 is a transverse sectional view thereof. The symbols X, Y, and Z in the figure indicate the thickness direction, width direction, and height direction of the cell 1, respectively. Further, reference signs U and D respectively indicate upper and lower sides in the height direction of the cell 1. In the present embodiment, the thickness direction X, the width direction Y, and the height direction Z are orthogonal to each other. However, these are merely directions for the convenience of description, and the configuration, arrangement, use, and the like of the present cell are not limited at all thereby.

The cell case 10 of the present embodiment has a thin (in some embodiments, flat) rectangular parallelepiped shape. The cell case 10 includes a case main body 12 and a lid member 14. The case main body 12 is a housing that has a rectangular tubular shape with a bottom and is open on one side. The lid member 14 is attached to the opening of the case main body 12 to seal the opening of the case main body 12. In the following description, the side with the opening of the case main body 12 may be called the upper side, and the side with the bottom of the case main body 12 may be called the lower side. The material of the cell case 10 is not particularly limited. As an example, the cell case 10 may be a metal material having high strength, relatively light weight, and good thermal conductivity, and may be, for example, aluminum, an aluminum alloy, stainless steel, nickel-plated steel, or the like.

The case main body 12 has a pair of long side surfaces (wide sides) 12a, a bottom surface 12b, and a pair of short side surfaces (narrow sides) 12c. The bottom surface 12b is orthogonal to the height direction Z. The pair of long side surfaces 12a is orthogonal to the thickness direction X and is provided so as to rise continuously from the bottom surface 12b. The pair of short side surfaces 12c is orthogonal to the width direction Y, and is provided so as to rise continuously from the bottom surface 12b and the pair of long side surfaces 12a. The case main body 12 has an internal space (cavity) formed by being surrounded by the pair of long side surfaces 12a, the bottom surface 12b, and the pair of short side surfaces 12c. In the case main body 12, the insulating film 30 and the electrode assembly 20 are accommodated in the inner space through the opening on the upper side.

A positive electrode terminal 42 and a negative electrode terminal 44 for external connection are attached to the lid member 14 in a state of being insulated from the lid member 14. The positive electrode terminal 42 and the negative electrode terminal 44 penetrate the cell case 10 (lid member 14) and protrude outside the cell case 10. The positive electrode terminal 42 and the negative electrode terminal 44 are electrically connected and mechanically fixed to a positive electrode current collection terminal 42a and a negative electrode current collection terminal 44a in the cell case 10. These positive electrode current collection terminals 42a and the negative electrode current collection terminal 44a can be made of a metal with favorable electrical conductivity, such as copper, nickel, an aluminum alloy and the like. The lid member 14 in the present embodiment is provided with a thin-wall safety valve 16 which is set to release the internal pressure in the cell case 10, and a liquid injection hole 18a for injecting a nonaqueous electrolytic solution. The liquid injection hole 18a is air-tightly sealed by a liquid injection plug 18b. The lid member 14 is joined by welding or the like to the case main body 12 accommodating the insulating film 30 and the electrode assembly 20.

The electrode assembly 20 is a power storage element of the cell 1. The electrode assembly 20 in the present embodiment is a wound electrode assembly. The electrode assembly 20 is formed by superimposing a long sheet-shaped positive electrode 22 and a long sheet-shaped negative electrode 24 in a state of being insulated from each other by two long sheet-shaped separators 26 interposed therebetween, and winding around the width direction orthogonal to the longitudinal direction of the positive and negative electrodes 22 and 24 as a winding axis to obtain an oval cross-sectional shape. The electrode assembly 20 is housed in the cell case 10 so that the width direction (that is, the winding axis direction) of the positive and negative electrodes 22 and 24 is in the width direction Y of the cell case 10, and so that the major axis of the oval cross section is in the height direction Z. Here, the positive electrode 22 of the electrode assembly 20 is welded to the positive electrode current collection terminal 42a, and the negative electrode 24 is welded to the negative electrode current collection terminal 44a. The positive electrode current collection terminal 42a and the negative electrode current collection terminal 44a are fixed to the electrode assembly 20 at both ends in the width direction Y, and stably support the electrode assembly 20 at a position separated from the lid member 14. Thus, the position of the electrode assembly 20 in the cell case 10 is defined, and the electrode assembly 20 is electrically connected to the positive electrode terminal 42 and the negative electrode terminal 44 while being separated from the cell case 10.

The insulating film 30 that separates the electrode assembly 20 and the cell case 10 is disposed between the electrode assembly 20 and the inner wall of the cell case 10. The insulating film 30 is made of, for example, an insulating resin material having a volume resistivity of $1 \times 10^{13}$ Ωcm or more. The insulating film 30 is in the form of a sheet. The insulating film 30 is disposed so as to cover the electrode assembly 20 from below, at least between the electrode assembly 20 and the bottom surface 12b and the pair of long side surfaces 12a of the case main body 12. A pair of end portions 30a of the insulating film 30 is located on the lid member 14 side with respect to the electrode assembly 20, that is, above the electrode assembly 20 in the height direction Z. The insulating film 30 is also disposed between the electrode assembly 20 and the pair of short side surfaces 12c of the case main body 12, e.g., by bending the end portions of the insulating film in the width direction Y. The insulating film 30 makes it possible to avoid direct contact between the electrode assembly 20 and the long side surfaces 12a, that is, between the electrode assembly 20 and the cell case 10, and electrically insulates the electrode assembly 20 and the cell case 10 from each other.

Figure 3A:
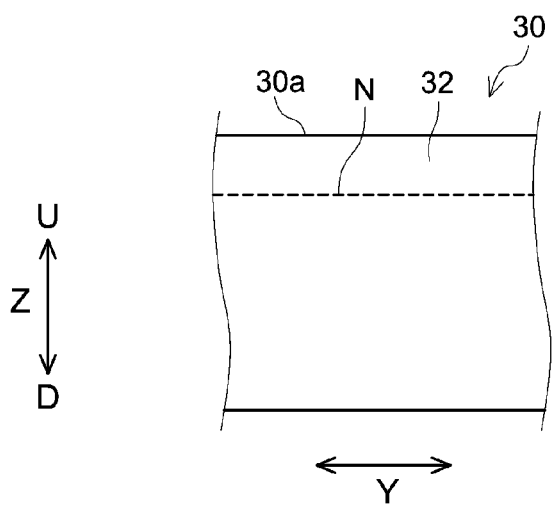
FIG. 3A is a front view of a main part for schematically explaining the incision provided in the insulating film according to one embodiment.

As shown in FIG. 3A, the insulating film 30 is provided with an incision N along the width direction Y. In other words, the incision N is provided at least in a part in the width direction Y which is orthogonal to the height direction Z and is along the long side surfaces 12a. Further, the incision N is provided between the position corresponding to an upper end portion 20a of the electrode assembly 20 and an upper end portion 30a of the insulating film 30 in the height direction Z. The incision N is provided on the surface of the insulating film 30 on the side facing the long side surface 12a of the cell case 10. A region on the side of the end portion 30a (that is, the upper part) with respect to the incision N constitutes an inclined surface 32 which inclines toward the electrode assembly 20 side. The inclined surface 32 is inclined so that the position thereof is gradually directed toward the center of the cell case 10 in the width direction (thickness direction X) as the end portion 30a is approached. As a result of providing the inclined surface 32 at the pair of end portions 30a of the insulating film 30, the upper end portion of the insulating film 30 has an inverted V shape in a cross-sectional view, so that the spacing between the pair of end portions becomes narrower toward the end portion 30a. For this reason, it is possible to trap metallic foreign matter which has entered from the gap between the lid member 14 and the case main body 12. Further, the metallic foreign matter trapped by the inclined surface 32 can be slipped into the gap between the cell case 10 and the insulating film 30, and the metallic foreign matter is rendered harmless by being prevented from penetrating into the electrode assembly 20. Further, by providing the incision N in the insulating film 30, the inclined surface 32 can be formed above the incision N, and the inclined surface 32 can be stably inclined. In addition, it may be, but not limiting, that the inclined surface 32 be of a substantially flat plate shape as shown in FIG. 2. However, the inclined surface 32 may include a curved surface as long as the purpose of trapping the metallic foreign matter is not impaired.

As a result of the inclination angle (angle of bending) θ of the inclined surface 32 with respect to the long side surface 12a being larger than 0°, the effect of trapping metallic foreign matter which enters from the gap between the lid member 14 and the case main body 12 is demonstrated, by contrast with the case where the inclined surface 32 is absent (inclination angle 0°). In addition, the effect of trapping metallic foreign matter is enhanced as the inclination angle θ of the inclined surface 32 increases. Although the inclination angle θ of the inclined surface 32 depends on the dimension from the upper end portion 30a of the insulating film 30 to the incision N and cannot be generally defined, the inclination angle may be 1° or more, or 5° or more, and is, for example, 10° or more. Since the metallic foreign matter enters from the gap between the lid member 14 and the case main body 12, in the region above the electrode assembly 20, the metallic foreign matter is less likely to penetrate deeply close to the center in the thickness direction X of the case main body 12. Accordingly, the effect of trapping the metallic foreign matter demonstrated by the inclined surface 32 can be substantially saturated when the inclination angle θ exceeds about 30°. From this point of view, it is exemplified that the inclination angle θ of the inclined surface 32 is set to, for example, about 30° as the upper limit. By setting the upper limit of the inclination angle θ of the inclined surface 32 to about 30°, it is possible to mitigate suitably the impact of the difference in how the inclined surface 32 traps one metallic foreign matter. As a result, even after the inclined surface 32 traps one metallic foreign matter, the effect of subsequently trapping the metallic foreign matter can be maintained without increasing the inclination angle θ. In another aspect, when the cell 1 is configured to include a nonaqueous electrolytic solution and the nonaqueous electrolytic solution is injected into the cell case 10 from the injection hole 18a of the lid member 14, in terms of liquid injection ability, it not may be that the inclined surface 32 reach the vicinity of the center of the case main body 12 in the thickness direction X. That is, the inclined surface 32 will also trap the nonaqueous electrolytic solution supplied from the liquid injection hole 18a and may inhibit the direct supply of the nonaqueous electrolytic solution to the electrode assembly 20. Also from this viewpoint, the inclination angle θ of the inclined surface 32 may be set to, for example, about 30° as the upper limit.

For example, where the dimension of the electrode assembly 20 in the thickness direction X is denoted by $T_0$, the distance $T_1$ between the pair of end portions 30a constituting the inclined surface 32 may be less than $1 \times T_0$. As a result, the effect of trapping the metallic foreign matter entering from the gap between the lid member 14 and the case main body 12 is demonstrated, by contrast with the case where there is no inclined surface 32 (inclination angle 0°). The distance $T_1$ may be $0.98 \times T_0$ or less, and may be $0.95 \times T_0$ or less, for example, $0.9 \times T_0$ or less, $0.85 \times T_0$ or less, $0.8 \times T_0$ or less, $0.75 \times T_0$ or less, $0.7 \times T_0$ or less, or the like. The distance $T_1$ may be, for example, $0.53 \times T_0$ or more. As a result, the metallic foreign matter can be efficiently trapped without providing the excessively wide inclined surface 32. Further, in the cell 1 having a configuration in which the nonaqueous electrolytic solution is injected from the liquid injection hole 18a of the lid member 14, such dimensions may be also in that there is no risk of impairing the injection property of the nonaqueous electrolytic solution. The distance $T_1$ may be $0.55 \times T_0$ or more, may be $0.6 \times T_0$ or more, and may be, for example, $0.65 \times T_0$ or more.

Further, the height dimension H before bending between the pair of end portions 30a constituting the inclined surface 32 may be, but is not limited to, for example, $135 \times T_4$ or more, where $T_4$ stands for the plate thickness of the portion of the long side surface 12a of the case main body 12. In such a case, it is possible to form the inclined surface 32 that can suitably realize the aforementioned distance between the end portions. The height dimension H may be $136.25 \times T_4$ or more, and may be $137 \times T_4$ or less. The height dimension H may be also, for example, $150 \times T_4$ or less. In such a case, it is possible to form the inclined surface 32 that can suitably realize the aforementioned distance between the end portions, without providing the excessively wide inclined surface 32. The height dimension H may be $149.75 \times T_4$ or less, and may be $148 \times T_4$ or less, for example, $145 \times T_4$ or less.

Figure 4:
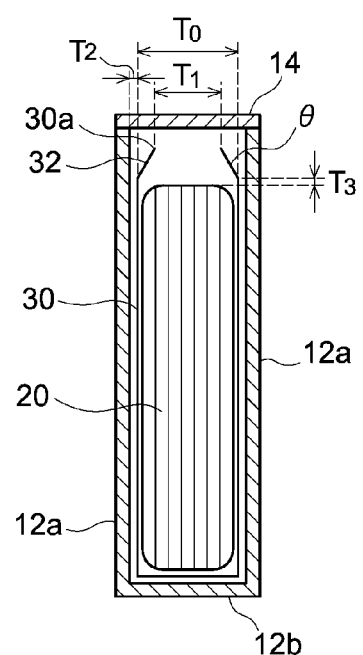
FIG. 4 is a cross-sectional view schematically showing the structure of a cell according to another embodiment.

As described hereinabove, such an incision N is provided between the position corresponding to the upper end portion 20a of the electrode assembly 20 and the upper end portion 30a of the insulating film 30 in the height direction Z. The difference $T_3$ between the position of the incision N in the height direction Z and the position of the end portion 20a of the electrode assembly 20 may be, for example, about 0 mm to 3 mm. When the electrode assembly 20 is a wound electrode assembly, as shown in FIG. 2, the upper end portion 20a of the electrode assembly 20 is curved and has no corners in a cross section. Therefore, even when the incision N is provided below the end portion 20a (for example, in the range of about 0 mm to −3 mm), it is conceivable that the possibility of the electrode assembly 20 and the inclined surface 32 coming into contact with each other will be low. However, where the inclined surface 32 is bent or where vibration occurs when the cell is used, the insulating film 30 may come into contact with the electrode assembly 20 thereby damaging the electrode assembly 20. From this point of view, the difference $T_3$ may be set, for example, in the range of 0 mm to 3 mm. Further, when the electrode assembly 20 is a stacked electrode assembly, which will be described later, as shown in FIG. 4, the electrode assembly 20 has corners at the upper end portion 20a in the cross section. Therefore, there is a possibility that the insulating film 30 may be damaged by the contact between the corners of the electrode assembly 20 and the insulating film 30. For this reason, in the case where the electrode assembly 20 is a stacked electrode assembly described later, the incision N may be provided above the end portion 20a, for example, in a range where the difference $T_3$ is about 0.5 mm to 3 mm.

Further, the incision N is provided in at least in a part in the width direction Y. From the viewpoint of trapping metallic foreign matter with a higher probability, the incision N may be provided over a length of 50% or more, where the size of the electrode assembly 20 in the width direction Y is designated as 100%. The size of the incision N in the width direction Y may be 60% or more, 70% or more, 80% or more, and 90% or more, and, for example, may be 100%. Depending on the shapes and mounting positions of the positive electrode current collection terminal 42a and the negative electrode current collection terminal 44a, the inclined surface 32 may interfere with the positive electrode current collection terminal 42a and the negative electrode current collection terminal 44a. In such a case, the inclined surface 32 may not be provided at a position where there is a possibility of interference with the positive electrode current collection terminal 42a and the negative electrode current collection terminal 44a. This is so because the penetration of metallic foreign matter into the electrode assembly 20 can be suppressed due to the presence of the positive electrode current collection terminal 42a and the negative electrode current collection terminal 44a. For example, when the positive electrode current collection terminal 42a and the negative electrode current collection terminal 44a are both joined to the electrode assembly 20 at one surface of the electrode assembly 20 in the width direction (thickness direction X), the insulating film 30 which is to be disposed on the side of this one surface of the electrode assembly 20 may not be provided with the inclined surface 32 at the position facing the positive electrode current collection terminal 42a and the negative electrode current collection terminal 44a, and may be provided with the inclined surface 32 at other positions. Further, the insulating film 30 disposed on the side of the other surface opposite to the abovementioned one surface of the electrode assembly 20 may be provided with the inclined surface 32, for example, over 100% of the dimension of the electrode assembly 20 in the width direction Y.

The insulating film 30 disclosed herein is configured to actively trap the metallic foreign matter entering from the gap between the lid member 14 and the case main body 12. Therefore, in some embodiments, a gap $T_2$ may be provided between the insulating film 30 and the case main body 12 so that the trapped metallic foreign matter could pass below the case main body 12. Such a gap $T_2$ may be, for example, 0.1 mm or more, and may be 0.2 mm or more, 0.3 mm or more, or 0.4 mm or more, according to the size of the target metallic foreign matter. However, the cell 1 is also required to have a high volume energy density. From this point of view, the gap $T_2$ may be, for example, about 0.8 mm or less and about 0.7 mm or less. The gap $T_2$ may be considered on the basis of a state in which the electrode assembly 20 is not swollen by the charging operation or the like. As a result, a configuration is realized in which the trapped metallic foreign matter can be suitably prevented from entering the inside of the electrode assembly 20 when the cell is subsequently used.

Figure 3B:
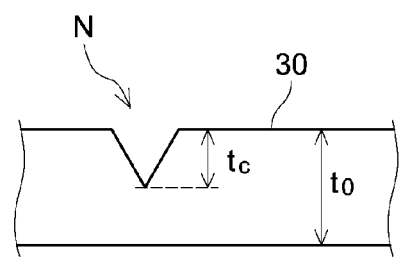
FIG. 3B is a cross-sectional view of a main part for schematically explaining an incision provided in the insulating film of FIG. 3A.

As shown in FIG. 3B, the incision N is provided to a depth $t_C$ less than the total thickness $t_0$ of the insulating film 30. The incision N is formed by, for example, so-called half-cut processing. The depth $t_C$ of the incision N of the insulating film 30 may be set, for example, such that the ratio $t_C/t_0$ to the total thickness $t_0$ of the insulating film 30 is about 1/2.5 or more. In such a case, the depth of the incision N can be made sufficiently large, and when the inclined surface 32 is formed by inclining the end portion 30a side with respect to the incision N, it is possible to suppress suitably the occurrence of hair cracks in the insulating film 30 at the incision N portion or breakage due to cracking. The ratio may be, for example, 1/2.3 or more, and may be ½ or more. Further, the ratio ($t_C/t_0$) may be set to be about 1/1.25 or less. As a result, the remaining thickness of the incision N portion can be sufficiently secured, the strength of the insulating film 30 in the incision portion can be secured, and it is possible to prevent suitably the insulating film 30 from being run through, cracked or broken at the incision N portion. The ratio ($t_C/t_0$) may be, for example, more than 1/1.25, may be 1/1.5 or more, and may be 1/1.75 or more. In addition, in FIG. 3B, the incision N is provided to have a V-shaped cross section, but such a shape is not limiting. The cross-sectional shape of the incision N may be any selected from U-shaped (without corners), U-shaped (with corners), one slit or a plurality of slits (linear), etc., in addition to the V-shape.

A material for forming such an insulating film 30 is not particularly limited, and various materials which have the electrical insulation property such as mentioned above can be used. The volume resistivity of the insulating film 30 may be, for example, $1 \times 10^{15}$ Ωcm or more, and may be $1 \times 10^{18}$ Ωcm or more. Further, for the cell 1 used as a driving power supply of an automobile or the like, a high output at a high rate is required and the cell may be subjected to vibrations at the time of use. The insulating film 30 used for the cell 1 to be used in such applications may have a melting point of, for example, 120° C. or more, in order to have heat resistance required to withstand the heat stored in the cell. Further, for example, from the viewpoint of suitably maintaining the inclination angle of the inclined surface 32, it may be that the tensile strength at 25° C. be about 20 N/10 mm or more. For example, a stretched or non-stretched sheet-shaped resin made of a polyolefin resin such as polypropylene (PP) or polyethylene (PE) may be used as the insulating film 30, but these examples are not limiting. In some embodiments, for example, the insulating film 30 may be a polypropylene homopolymer. Although the thickness of the insulating film 30 is not strictly limited, the average thickness may be, for example, about 100 μm or more, and can be appropriately changed in accordance with a desired cell configuration and the like. For example, the average thickness of the insulating film 30 can be about 110 μm or more and 200 μm or less.

Figure 6A:
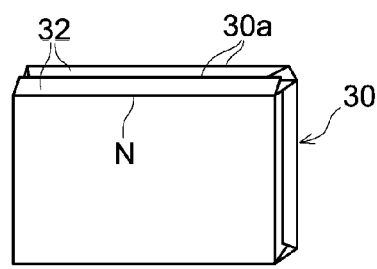
FIGS. 6A to 6D are perspective views illustrating the folded form of the insulating film.
Figure 6B:
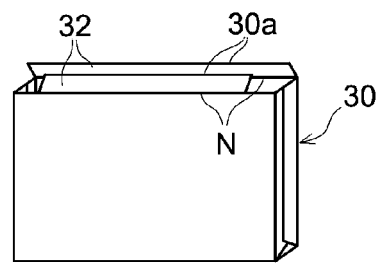
Figure 6C:
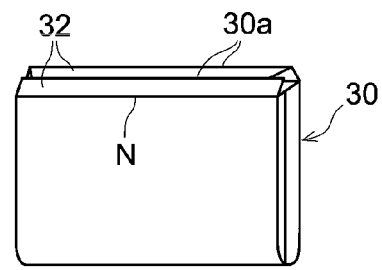
Figure 6D:
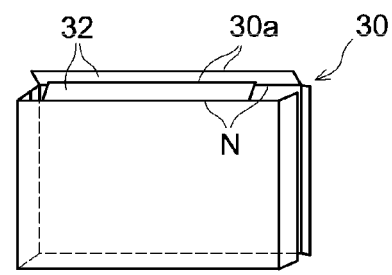

In some configuration examples of the insulating film 30, FIGS. 6A to 6D show only the insulating film 30 extracted from the cell 1. The insulating film 30 shown in FIG. 6A is configured by bending one rectangular insulating film 30. The insulating film 30 has, for example, a bottom portion corresponding to the bottom surface 12b of the case main body 12 at the center in the longitudinal direction. Further, a pair of long side surface portions corresponding to the long side surfaces 12a of the case main body 12 is provided so as to be continuous with the bottom portion and to sandwich the bottom portion in the longitudinal direction. The insulating film 30 further has a pair of inclined surfaces 32 provided to be continuous with the long side surface portions and to sandwich the long side surface portions in the longitudinal direction. The insulating film 30 is configured to cover the electrode assembly from below by the bottom surface portion, the pair of long side surface portions, and the inclined surfaces 32. At both ends of the pair of long side surface portions, there are a total of four short side surface portions corresponding to the short side surfaces 12c of the case main body 12. At both ends of the bottom portion, there are a total of two gusset portions constituting portions corresponding to the short side surfaces 12c of the case main body 12 in cooperation with the short side surface portions, or forming overlapping portions that overlap with the short side surface portions. By appropriately folding the short side surface portions and the gusset portions, the insulating film 30 can be maintained in a shape covering the electrode assembly, without, for example, welding the insulating film 30 or bonding the insulating film by a fixing means such as a tape. At four corners continuous with both the portions corresponding to the short side surfaces 12c of the case main body 12 and the inclined surfaces 32 in the rectangular insulating film 30, the film is valley-like folded obliquely upward from the contact points between the portions corresponding to the short side surfaces 12c and the inclined surfaces 32. As a result, the angle of the inclined surface 32 is stabilized. In the insulating film 30 shown in FIG. 6B, the four abovementioned corner portions of the rectangular insulating film 30 shown in FIG. 6A and the inclined surfaces 32 thereof in portions that interfere with the positive electrode current collection terminal 42a and the negative electrode current collection terminal 44a have been removed. As a result, the folding process is simplified. The insulating film 30 shown in FIG. 6C is obtained from the rectangular insulating film 30 shown in FIG. 6A by providing a slit along the width direction Y (or the thickness direction X) in a portion (the above-mentioned gusset portion) continuous with both the portion corresponding to the bottom surface 12b and the portion corresponding to the short side surface 12c. As a result, the lower end portion of the insulating film 30 can be curved, for example, along the curved portion of the wound electrode assembly. The shape of the insulating film 30 shown in FIG. 6D after bending is the same as that of the insulating film 30 shown in FIG. 6B, but one short side surface portion is disposed at the center in the longitudinal direction, and a pair of long side surface portions and the other short side surface portion are disposed and configured to sandwich the one short side surface portion in the longitudinal direction. The bottom surface portion and the inclined surface are provided, for example, continuously with the long side surface portion on the side thereof. As described above, the spread pattern of the insulating film 30 is not particularly limited, and the film can be formed by bending a random spread pattern.

Regarding the electrode assembly 20, materials similar to those used for the conventional lithium ion secondary cell can be used for the positive electrode 22 and the negative electrode 24 without any particular limitation. Some embodiments are described hereinbelow.

A positive electrode current collector constituting the positive electrode 22 can be exemplified by an aluminum foil or the like. A positive electrode active material contained in the positive electrode active material layer can be exemplified by lithium transition metal oxides (for example, $LiNi_{1/3}Co_{1/3}Mn_{1/3}O_2$, $LiNiO_2$, $LiCoO_2$, $LiFeO_2$, $LiMn_2O_4$, $LiNi_{0.5}Mn_{1.5}O_4$, and the like), lithium transition metal phosphates (for example, $LiFePO_4$ and the like) and the like. The positive electrode active material layer may include components other than the active material, such as a conductive material and a binder. As the conductive material, for example, carbon black such as acetylene black (AB) and other carbon materials (for example, graphite and the like) can be suitably used. As the binder, for example, polyvinylidene fluoride (PVDF) and the like can be used.

A negative electrode current collector constituting the negative electrode 24 can be exemplified by a copper foil or the like. A negative electrode active material contained in the negative electrode active material layer can be exemplified by carbon materials such as graphite, hard carbon, soft carbon, and the like; lithium titanate ($Li_4Ti_5O_{12}$: LTO); Si; Sn and the like. The negative electrode active material layer may include components other than the active material, such as a binder and a thickener. As the binder, for example, styrene butadiene rubber (SBR) and the like can be used. As the thickener, for example, carboxymethylcellulose (CMC) and the like can be used.

Examples of the separator 26 include porous sheets made of a resin such as polyethylene (PE), polypropylene (PP), polyester, cellulose, polyamide and the like. The porous sheet may have a single layer structure, or may have a laminated structure consisting of two or more layers (for example, a three-layer structure in which a PP layer is laminated on both sides of a PE layer). A heat resistant layer (HRL) may be provided on the surface of the separator 26.

A solution in which an electrolyte salt is dissolved in a nonaqueous solvent can be used as the nonaqueous electrolytic solution. Examples of the electrolyte salt include lithium salts such as $LiPF_6$, $LiBF_4$, $LiClO_4$, $LiAsF_6$, $Li(CF_3SO_2)_2N$, and $LiCF_3SO_3$. The nonaqueous solvent is not particularly limited as long as the electrolyte salt can be dissolved, and carbonates, ethers, esters, nitriles, sulfones and the like can be used. Among them, carbonates such as ethylene carbonate (EC), propylene carbonate (PC), diethyl carbonate (DEC), dimethyl carbonate (DMC), ethyl methyl carbonate (EMC) and the like are used. These can be used alone or in combination of two or more. The concentration of the electrolyte salt may be appropriately determined according to the type of electrolyte salt, and may be 0.5 mol/L or more and 5 mol/L or less, may be 0.7 mol/L or more and 2.5 mol/L or less. In the nonaqueous electrolytic solution, for example, a gas generator such as biphenyl (BP) and cyclohexylbenzene (CHB); other film forming agent; a dispersant; a thickener and the like may be included as long as the effects of the present art are not significantly impaired.

The lithium ion secondary cell 1 configured as described above can be used for various applications. Suitable applications include driving power supplies to be mounted on vehicles such as electric vehicles (EVs), hybrid vehicles (HVs), plug-in hybrid vehicles (PHVs) and the like. The lithium ion secondary cell 1 can also be used typically in the form of a cell pack formed by connecting a plurality of cells in series and/or in parallel.

In the above description, the rectangular lithium ion secondary cell 1 including the flat wound electrode assembly 20 has been described. However, the cell 1 may be provided with a stacked electrode assembly 20 in which a plurality of plate-shaped positive electrodes 22 and negative electrodes 24 is stacked with the separator 26 interposed therebetween. In addition, the cell 1 may include a solid electrolyte or a gel electrolyte instead of the nonaqueous electrolytic solution. In this case, the lid member 14 of the cell case 10 may not be provided with the liquid injection hole 18*a* and the liquid injection plug 18*b*.

Examples of the present art will be described below, but the present art is not intended to be limited to the examples.

Preparation of Lithium Ion Secondary Cell for Evaluation

As a cell case, a cell can made of an aluminum alloy and configured of a rectangular case main body and a lid member was prepared. A positive electrode current collection terminal and a negative electrode current collection terminal were welded in advance to the lid member. A polypropylene film having a thickness of about 0.15 mm was prepared as an insulating film. In addition, a nonaqueous electrolytic solution in which $LiPF_6$ was dissolved at a concentration of 1.0 mol/L in a mixed solvent in which ethylene carbonate (EC), dimethyl carbonate (DMC) and ethyl methyl carbonate (EMC) were mixed at a volume ratio of EC:DMC:EMC=30:40:30 as electrolytes was prepared. The lid member was provided with a liquid injection hole for injecting the electrolytic solution into the cell case, and a sealing member for sealing the liquid injection hole.

A slurry for forming a positive electrode active material layer was prepared by mixing $LiNi_{1/3}Co_{1/3}Mn_{1/3}O_2$ (LNCM) as a positive electrode active material powder, acetylene black (AB) as a conductive material, and polyvinylidene fluoride (PVdF) as a binder with N-methylpyrrolidone (NMP) at a mass ratio LNCM:AB:PVdF=87:10:3. The slurry was applied to both sides of a long aluminum foil so that an uncoated portion remained along one end in the width direction and coating strips were formed in the other regions, followed by drying and then roll pressing to produce a positive electrode sheet.

A slurry for forming a negative electrode active material layer was prepared by mixing a natural graphite-based carbon material (C), styrene butadiene rubber (SBR) as a binder, and carboxymethyl cellulose (CMC) as a thickener with ion-exchanged water at a mass ratio of C:SBR:CMC=98:1:1. The slurry was applied to both sides of a long copper foil so that an uncoated portion remained along one end in the width direction and coating strips were formed in the other regions, followed by drying and then roll pressing to produce a negative electrode sheet.

Two porous polyolefin sheets having a three-layered structure of PP/PE/PP were prepared as separator sheets. Then, an electrode assembly was produced by laminating the positive electrode sheet and the negative electrode sheet in a state of being insulated from each other by the separator sheet interposed therebetween, and the laminate was wound so as to obtain a substantially oval cross section. The positive electrode sheet and the negative electrode sheet were laminated so that the negative electrode active material layer protruded in the width direction from both ends of the positive electrode active material layer and so that the uncoated portions (current collecting foils) of the positive electrode sheet and the negative electrode sheet protruded in different directions in the width direction. A positive electrode current collection terminal and a negative electrode current collection terminal were respectively welded to the uncoated portions of the positive electrode and the negative electrode protruding to both axial ends of the winding of the electrode assembly, thereby attaching the electrode assembly to the lid member.

Figure 7:
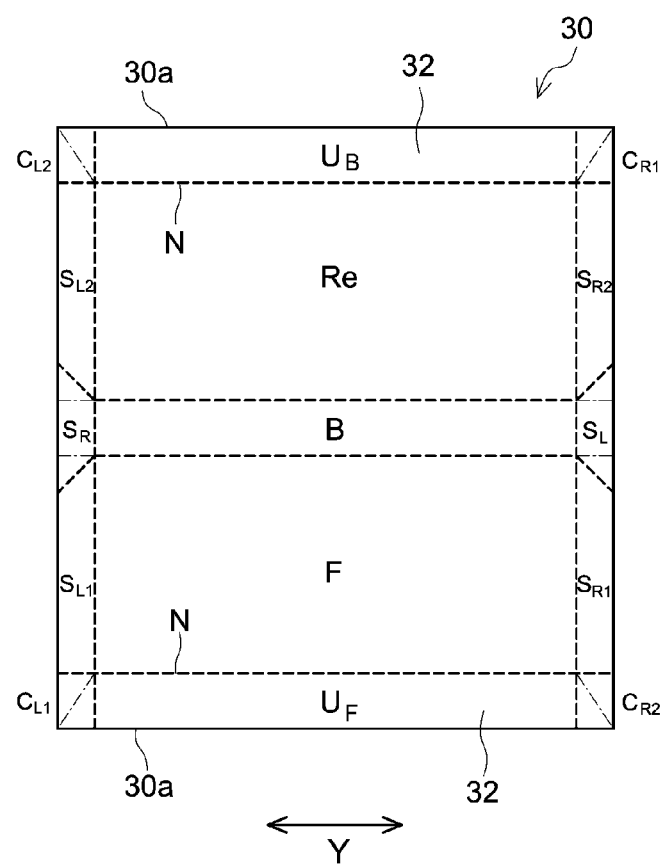
FIG. 7 is a spread view for schematically explaining the incisions provided in the insulating film according to one embodiment.

Next, the electrode assembly fixed to the lid member was covered with an insulating film. Specifically, as shown in FIG. 7, half-cut processing was performed in advance on one side of a rectangular insulating film, and incision lines for bending were provided. For two incisions N, the depth of incision was changed to four modes of 0.05 mm, 0.06 mm, 0.12 mm, and 0.13 mm, and the depth of incision was fixed at 0.1 mm for other incision line. Among the incision lines in FIG. 7, the dotted lines become mountain-folded and the dashed-dotted lines become (finally) valley-folded in the subsequent folding process.

Then, the bottom surface portion B of the insulating film was brought into contact with the bottom portion of the electrode assembly (the end portion on the side opposite to the lid member) so that the surface on which the incision lines have been formed was on the outside (that is, the side not touching the electrode assembly), and initially, the front long side surface portion F and the rear long side surface portion Re of the insulating film were folded upward. Next, the left gusset portion $S_L$ and the right gusset portion $S_R$ of the insulating film were folded upward, and then the left short side surface portions $S_{L1}$, $S_{L2}$ and the right short side surface portions $S_{R1}$, $S_{R2}$ were folded toward the center in the thickness direction X. Here, the overlapping portions in the vicinity of the boundaries between the gusset portions $S_L$ and $S_R$ and the short side surface portions $S_{L1}$, $S_{L2}$, $S_{R1}$, $S_{R2}$ were accommodated by folding along the incision lines. Next, the corner portions $C_{L1}$, $C_{L2}$, $C_{R1}$, $C_{R2}$ located above the short side surface portions $S_{L1}$, $S_{L2}$, $S_{R1}$, $S_{R2}$ were bent toward the center in the width direction and bent so that the back inclined surface $U_B$ was inclined forward, and the front inclined surface $U_F$ was inclined backward. The inclination angles of the front inclined surface $U_F$ and the back inclined surface $U_B$ in a side view were variously changed between 0° and 31° as shown in Table 1 below. In the present embodiment, it was confirmed that the front inclined surface $U_F$ and the back inclined surface $U_B$ were slightly inclined due to the residual stress of the insulating film induced by providing the incisions N. Therefore, the incisions N were not provided for the sample for which the inclination angle had to be 0°. Furthermore, the insulating film has a property of not bending in the location where an incision is not present.

The appearance of the bending-processed portion of the front inclined surface $U_F$ and the back inclined surface $U_B$ of the insulating film was confirmed for the electrode assembly of each example which was fixed to the lid member and covered with the insulating film. In the examples in which the depth of the incision line was 0.06 mm (1/2.5 of the thickness) and 0.12 mm (1/1.25 of the thickness), no particular abnormality was found in the bending-processed portion of the front inclined surface $U_F$ and the back inclined surface $U_B$. However, in the sample in which the depth of the incision line of the insulating film was as small as 0.05 mm (⅓ of the thickness of the insulating film), the remaining thickness of the insulating film was relatively large, and it was confirmed that depending on the inclination angle in the bending process, stress could be concentrated on the top of the incision to cause cracking that could lead to the breakage of the insulating film. Meanwhile, in the sample in which the depth of the incision line was as large as 0.13 mm (1/1.14 of the thickness of the insulating film), the remaining thickness of the insulating film was relatively small, and it was confirmed that depending on the inclination angle in the bending process, a notch could progress in the depth direction at the end portion of the insulating film or the insulating film could be broken. Although a specific value depends on physical properties and inclination angle of the insulating film used, it may be that the incision depth be larger than approximately ⅓ of the thickness of the insulating film, or smaller than approximately 1/1.14 of the thickness of the insulating film. From the viewpoint of obtaining a more reliable cell, the following evaluation was performed only on a sample with the depth of the incision line of 0.05 mm.

Evaluation of Injection Property

Some of the electrode assemblies of each example that were fixed to the lid member and covered with the insulating film were used as samples for confirming the injection property of the nonaqueous electrolytic solution, and the injection property was evaluated. That is, the electrode assembly of each example that was fixed to the lid member and covered with the insulating film was inserted into the case main body from the opening at the top of the case main body, and the lid member was fitted to the case main body. Next, without welding the case main body and the lid member, a predetermined amount (42 g) of nonaqueous electrolytic solution was injected from the liquid injection hole of the lid member at a liquid injection rate of 45 g/min into the cell case via the liquid injection nozzle. Then, the lid member was slowly lifted from the case main body, and it was confirmed whether or not the nonaqueous electrolytic solution was supplied to the electrode assembly in the insulating film. Specifically, it was confirmed whether or not all the injected electrolytic solution was supplied in the insulating film, and the results were shown in the "Liquid injection property" of Table 1 below where "Good" represents the case where all the nonaqueous electrolytic solution was supplied in the insulating film, and "Bad" represent the case where the nonaqueous electrolytic solution overflowed to the outside from the film.

Incidence Rate of Defective Product Due to Micro Short Circuit

A part of the remaining electrode assemblies of each example covered with the insulating film were used as samples for confirming the presence or absence of penetration of metallic foreign matter, and the incidence rate of defective products due to micro short circuit was examined. That is, first, the electrode assembly fixed to the lid member and covered with the insulating film was inserted into the case main body from the opening at the top of the case main body, and the lid member was fitted to the case main body. Thereafter, the cell case was sealed by laser welding the lid member and the case main body. Next, a predetermined amount of the nonaqueous electrolytic solution was injected into the cell case from the injection hole of the lid member, the injection hole was closed with a sealing member, and then the injection hole and the sealing member were laser welded to seal hermetically the cell case. Thus, a lithium ion secondary cell (cell assembly) for evaluation was obtained. In addition, cells in which the inclination angle of the front inclined surface $U_F$ and the back inclined surface $U_B$ and the incision depth of the insulating film were changed were prepared by 40 or more cells for each condition.

After stabilizing each prepared lithium ion secondary cell for evaluation in a thermostat at 25° C., activation treatment was performed. As the activation treatment, charge and discharge treatment was repeated three times, the treatment including constant-current charging each lithium ion secondary cell to 4.1 V at a current value of 0.3 C and constant-current discharging to 3.0 V at a current value of 0.3 C.

Subsequently, each lithium ion secondary cell was subjected to constant-current charging to 3.5 V at a current value of 0.2 C, then constant-voltage charging was performed until the current value became ⅕₀ C, and an initial charge state was established. Thereafter, each lithium ion secondary cell was stored in a thermostat at 25° C., and transition of cell voltage was confirmed over 7 days. It was determined that a micro short circuit occurred in cells in which the cell voltage dropped to 0.1 V during the storage period, and such cells were evaluated as defective products. Then, the defective product incidence rate was calculated by the following formula: Defective product incidence rate (%)=(Number of defective cells produced under each condition)/(Number of cells prepared under each condition)× 100. The results are shown in the "Defective product incidence rate" column of Table 1 below and of FIG. 5.

TABLE 1

| Incision depth: 0.06 mm | | |
|---|---|---|
| Inclination angle [°] | Liquid injection property | Defective product incidence rate [%] |
| 0 | Good | 11.6 |
| 1 | Good | 11.2 |
| 2 | Good | 11.4 |
| 3 | Good | 10.4 |
| 4 | Good | 10.1 |
| 5 | Good | 9.2 |
| 6 | Good | 9.4 |
| 7 | Good | 8.4 |
| 8 | Good | 8.0 |
| 9 | Good | 7.9 |
| 10 | Good | 7.5 |

TABLE 1-continued

Incision depth: 0.06 mm

| Inclination angle [°] | Liquid injection property | Defective product incidence rate [%] |
|---|---|---|
| 11 | Good | 7.2 |
| 12 | Good | 7.3 |
| 13 | Good | 7.1 |
| 14 | Good | 7.0 |
| 15 | Good | 6.9 |
| 16 | Good | 6.5 |
| 17 | Good | 6.2 |
| 18 | Good | 6.1 |
| 19 | Good | 6.2 |
| 20 | Good | 6.2 |
| 21 | Good | 6.0 |
| 22 | Good | 5.9 |
| 23 | Good | 5.8 |
| 24 | Good | 5.3 |
| 25 | Good | 5.4 |
| 26 | Good | 5.2 |
| 27 | Good | 5.2 |
| 28 | Good | 5.1 |
| 29 | Good | 5.0 |
| 30 | Good | 4.9 |
| 31 | Bad | — |

Figure 5:
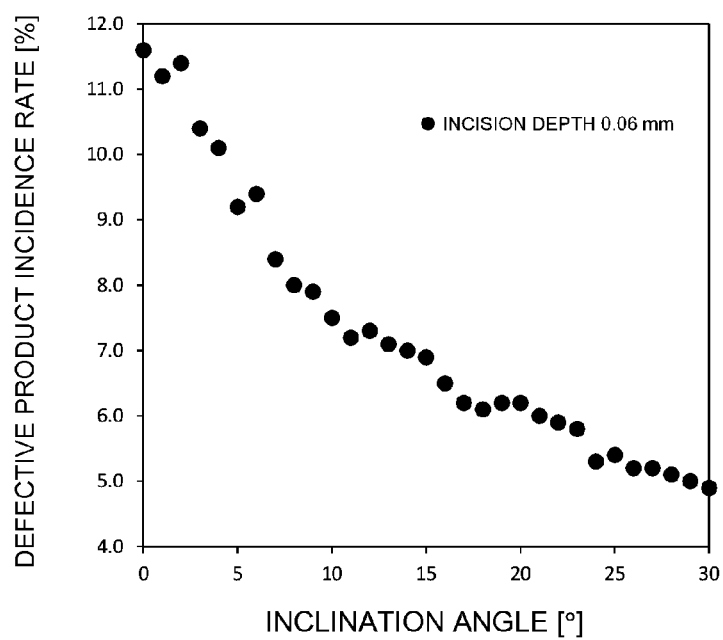
FIG. 5 is a graph showing the relationship between the inclination angle of the inclined surface of the cell according to one embodiment and the defective product incidence rate.

As shown in FIG. 5, it was found that the defective product incidence rate observed in the micro short circuit test could be reduced by inclining the upper ends of the insulating film with incisions N to form the front inclined surface $U_F$ and the back inclined surface $U_B$. It was also found that the defective product incidence rate tended to decrease advantageously as the inclination angle increased. From this, it was found that by inclining the insulating film toward the inside of the case, it was possible to effectively suppress the ratio of metallic foreign matter that penetrates into the electrode assembly (such penetration is unavoidable during cell assembly) and leads to a micro short circuit. In other words, it was confirmed that by inclining the upper ends of the insulating films inward, it was possible to trap suitably, on the outer side of the insulating film, the metallic foreign matter penetrating into the case at the time of fitting of the lid member of the metal cell case and the case main body, and the metallic foreign matter derived from welding spatter generated at the time of welding, and the metallic foreign matter could be prevented from causing micro short circuit. Although specific data are not shown, substantially the same results were obtained for the samples with an incision depth of 0.12 mm.

However, as shown in Table 1, it was confirmed that where the inclination angles of the front inclined surface $U_F$ and the back inclined surface $U_B$ exceeded 30°, the injection property of the nonaqueous electrolytic solution was not good, regardless of the insulating film incision depth. It can be said that where the inclination angle of the front inclined surface $U_F$ and the back inclined surface $U_B$ exceeds 30°, the nonaqueous electrolytic solution may not be easily injected into the inside of the insulating film, and it is possible that it would be difficult to impregnate the nonaqueous electrolytic solution into the electrode assembly. Therefore, it can be said that in the type of cell in which the nonaqueous electrolytic solution is injected, in some embodiments, the inclination angles of the front inclined surface $U_F$ and the back inclined surface $U_B$ can be kept at about 30° or less, although the specific inclination angles depend on the dimensions of the front inclined surface $U_F$ and the back inclined surface $U_B$ in the height direction.

As follows from the above, with the cell according to the present embodiment described above, the penetration of metallic foreign matter, which inevitably enters the cell case, into the electrode assembly can be suppressed and the occurrence of micro short circuit caused by the metallic foreign matter can be suppressed. The specific examples of the present art have been described hereinabove in detail, but these are merely illustrative and do not limit the scope of the disclosure. The art set forth in the claims is inclusive of various variations and modifications of the specific examples illustrated above.

What is claimed is:

1. A cell comprising a rectangular cell case, an electrode assembly housed in the cell case, and an insulating film disposed between the cell case and the electrode assembly,
   the cell case comprising a case main body having an opening, and a lid member that closes the opening;
   the case main body comprising a bottom surface opposite to the opening, and a pair of long side surfaces provided so as to rise continuously from the bottom surface;
   the insulating film having a sheet form, and being disposed between at least the electrode assembly and the bottom surface and the pair of long side surfaces, and a pair of end portions of the insulating film in the height direction connecting the bottom surface and the lid member being located on the lid member side with respect to the electrode assembly;
   wherein, in the insulating film, incisions are provided in a thickness direction of the insulating film at least in part in a width direction which is orthogonal to the height direction and is along the long side surfaces, between a position corresponding to an end portion of the electrode assembly on the lid member side and the pair of end portions;
   regions on the side of the pair of end portions with respect to the incisions constitute inclined surfaces which incline toward the electrode assembly side; and
   an inclination angle of the inclined surface is more than 10° and equal to or less than 30°.

2. The cell according to claim 1, wherein when a dimension of the electrode assembly in the thickness direction orthogonal to the height direction and the width direction is denoted by $T_0$, a distance $T_1$ between the pair of end portions constituting the inclined surface is $0.53 \times T_0$ or more and less than $1 \times T_0$.

3. The cell according to claim 1, wherein a depth of the incision is 1/2.5 or more and 1/1.25 or less of a thickness of the insulating film.

4. The cell according to claim 1, wherein the incision is provided on a surface of the insulating film facing the case main body.

5. The cell according to claim 1, wherein the cell case is made of a metal, and the case main body and the lid member are welded.

6. The cell according to claim 1, wherein the difference in the height direction between the position of the incisions and the position of the end portion of the electrode assembly on the lid member side is 0.5 mm to 3 mm.

* * * * *